US008260604B2

(12) United States Patent
Harrenstien et al.

(10) Patent No.: US 8,260,604 B2
(45) Date of Patent: Sep. 4, 2012

(54) SYSTEM AND METHOD FOR TRANSLATING TIMED TEXT IN WEB VIDEO

(75) Inventors: Kenneth Harrenstien, Palo Alto, CA (US); Greg Millam, Seattle, WA (US); Yuji Sunouchi, Tokyo (JP); Toliver Jue, Tokyo (JP)

(73) Assignee: Google Inc., Mountain View, CA (US)

( * ) Notice: Subject to any disclaimer, the term of this patent is extended or adjusted under 35 U.S.C. 154(b) by 405 days.

(21) Appl. No.: 12/608,677

(22) Filed: Oct. 29, 2009

(65) Prior Publication Data

US 2010/0138209 A1    Jun. 3, 2010

Related U.S. Application Data

(60) Provisional application No. 61/109,487, filed on Oct. 29, 2008.

(51) Int. Cl.
*G06F 17/28* (2006.01)
(52) U.S. Cl. .................... 704/3; 704/2; 704/270
(58) Field of Classification Search .................. 704/2–8, 704/270
See application file for complete search history.

(56) References Cited

U.S. PATENT DOCUMENTS

| | | | | |
|---|---|---|---|---|
| 6,857,022 B1 * | 2/2005 | Scanlan | ................ | 709/229 |
| 2003/0040899 A1 * | 2/2003 | Ogilvie | ................ | 704/2 |
| 2004/0010630 A1 * | 1/2004 | Becher-Wickes et al. | .... | 709/250 |
| 2005/0058435 A1 * | 3/2005 | Chung et al. | ................ | 386/95 |
| 2005/0157948 A1 * | 7/2005 | Lee | ................ | 382/299 |
| 2006/0095249 A1 * | 5/2006 | Kong et al. | ................ | 704/7 |
| 2007/0244688 A1 * | 10/2007 | Bangalore et al. | ................ | 704/3 |
| 2008/0085099 A1 * | 4/2008 | Guihot | ................ | 386/95 |
| 2009/0043562 A1 * | 2/2009 | Peshave et al. | ................ | 704/2 |
| 2009/0178010 A1 * | 7/2009 | Chaudhri | ................ | 715/863 |
| 2009/0287472 A1 * | 11/2009 | Holtman | ................ | 704/8 |

FOREIGN PATENT DOCUMENTS

| | | |
|---|---|---|
| EP | 1 158 799 A1 | 11/2001 |
| WO | WO 2007/119893 A1 | 10/2007 |
| WO | WO 2008/032184 A2 | 3/2008 |

OTHER PUBLICATIONS

Korean Intellectual Property Office, "PCT—Notification of Transmittal of the International Search Report and the Written Opinion of the International Searching Authority, or the Declaration & PCT—Written Opinion of the International Search Authority," mailed May 20, 2010, International Appln. No. PCT/US2009/062585, International Filing Date: Oct. 29, 2009; 11 pages.

* cited by examiner

*Primary Examiner* — Douglas Godbold
(74) *Attorney, Agent, or Firm* — Sterne, Kessler, Goldstein & Fox PLLC

(57) ABSTRACT

This invention relates to translating timed text in web video. In a first embodiment, a method automatically translates timed text for web video. The method includes receiving a request identifying a web video from a client. In response to the request, a timed text track for the web video is retrieved from a timed text database. Each timed text track in the timed text database specifies text to display at particular times in a video. Text from the timed text track is automatically translated to a target language. Finally, the translated text is sent to the client to display with the web video.

12 Claims, 10 Drawing Sheets

SYSTEM AND METHOD FOR TRANSLATING TIMED TEXT IN WEB VIDEO

This is a nonprovisional of U.S. Provisional Application No. 61/109,487 filed Oct. 29, 2008, incorporated by reference herein in its entirety.

BACKGROUND

1. Field of the Invention

This invention generally relates to captioning in web video.

2. Related Art

Video is increasingly being accessed by remote users over networks, such as the Internet. The rise of the World Wide Web, including various web applications, protocols, and related networking and computing technologies has made it possible for remote users to view and to play video.

Timed text, such as a caption or subtitle, is sometimes provided with video content and is "timed" so that certain text appears in association with certain portions of a video content. Timed text can serve a number of purposes. First, timed text can make the dialogue understandable to the hearing impaired. Second, timed text can make the video understandable in environments where audio is unavailable or not permitted. Third, timed text can provide commentary to video with educational or entertainment value. Finally, timed text can translate the audio for those who do not understand the language of the dialogue. Of course, the benefits of timed text only arise when the timed text is available in a viewer's language.

Web video services are often available globally and many videos are available produced by individuals from other countries. For those videos, timed text is often not available in the viewer's language. Manual translation of timed text can be expensive and time-consuming.

BRIEF SUMMARY

This invention relates to translating timed text in web video. In a first embodiment, a method automatically translates timed text for web video. The method includes receiving a request identifying a target language from a client. In response to the request, a timed text track for the web video is retrieved from a timed text database. Each timed text track in the timed text database specifies text to display at particular times in a video. Text from the timed text track is automatically translated into the target language. Finally, the translated text is sent to the client to display with the web video.

In a second embodiment, a system automatically translates timed text for web video. The system includes a timed text database that stores timed text tracks. Each timed text track specifies text to display at particular times in a video. A machine translator automatically translates text. In response to a request identifying a target language from a client, a timed text server retrieves a timed text track from the timed text database, communicates with the machine translator to translate text from the timed text track into the target language and sends the translated text to the client to display with the web video.

In this way, timed text may be automatically translated into the viewer's language prior to being displayed at the client.

Further embodiments, features, and advantages of the invention, as well as the structure and operation of the various embodiments are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments of this invention translate timed text tracks "on demand" for an online video service, such as a GOOGLE VIDEO or YOUTUBE service available from Google, Inc. For example, if a user is watching a YOUTUBE video in a language the user does not understand, but the video has a timed text track, the user can request a machine translation and all of the video's timed text will promptly be shown in the requested language. By translating the dialogue of captioned videos into other languages, embodiments of the present invention provide for greater global accessibility of videos. By allowing for greater accessibility, embodiments increase the incentive for users to provide timed text to uncaptioned videos in the first instance.

System

Figure 1:
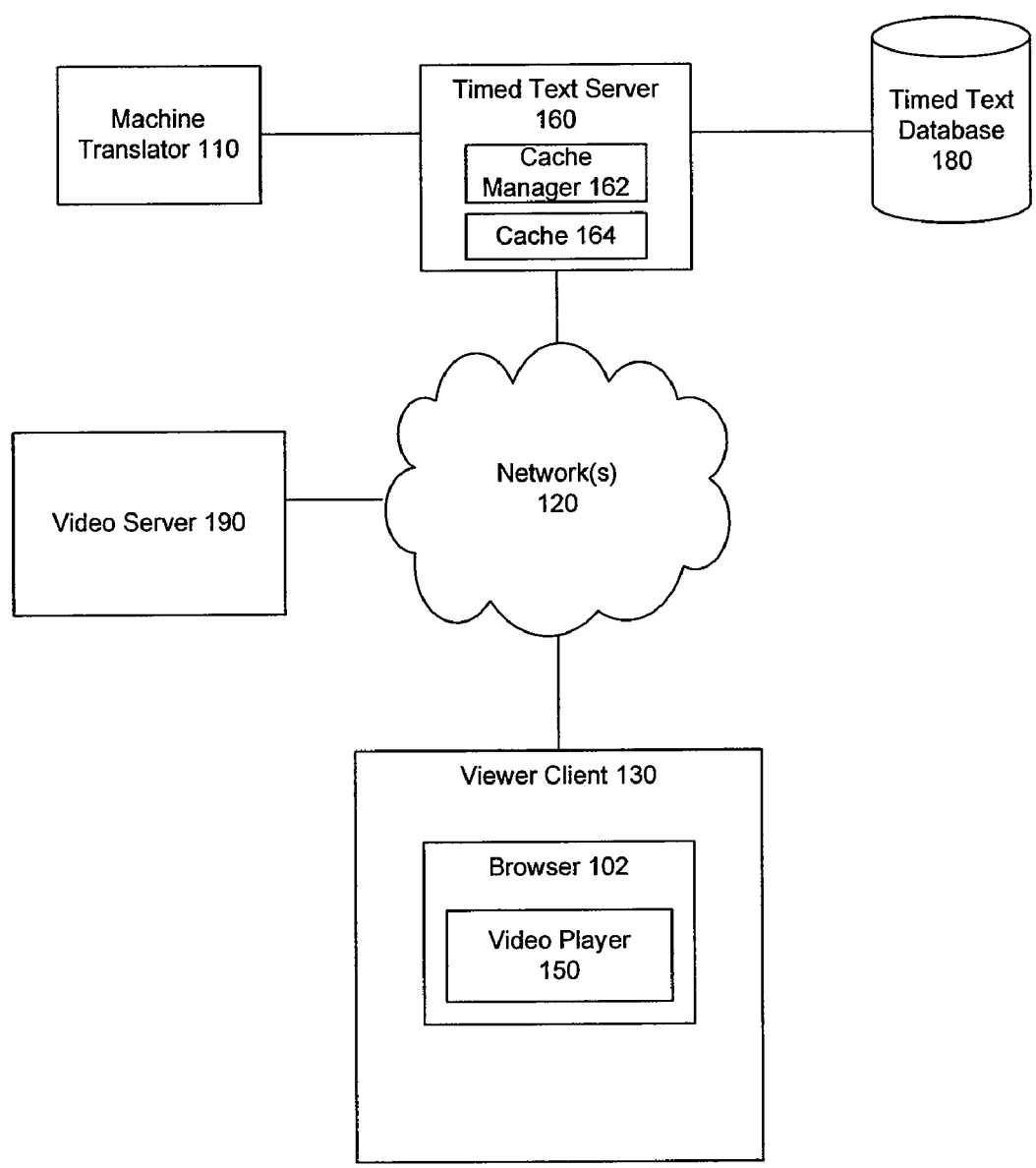
FIG. 1 is a diagram illustrating a system for translating timed text for web video according to an embodiment of the present invention.

FIG. 1 shows a diagram illustrating a system 100 for translating timed text for web video according to an embodiment of the present invention. System 100 includes a machine translator 110, a video server 190, a timed text server 160 and a timed text database 180. Timed text server 160 is coupled to viewer client 130 via one or more networks 120, such as the Internet.

In general, system 100 operates as follows. Viewer client 130 plays a video to a user streamed from video server 190. The user makes a request to viewer client 130 for timed text for the video being played in a selected language. Timed text viewer 130 sends the request to timed text server 160 via one or more networks 120. If timed text database 180 does not include a timed text track in the selected language but includes a timed text track in a different language, timed text database 180 sends the timed text track in the different language to machine translator 110. Machine translator 110 determines a translation of the timed text track and sends the translated timed text track to timed text server 160. Timed text server 160 sends the translated timed text track onto viewer client 130 via network 120. Finally, viewer client 130 displays the timed text track to the user. The operation and the supporting components are described in greater detail below.

Viewer client 130 includes a browser 102 and video player 150. In an embodiment, browser 102 receives an HTTP response containing a file. As an example, the file may be encoded in HTML or Flash. Browser 102 may interpret the file to instantiate video player 150.

Video player 150 enables a user to play a video and a corresponding timed text track. In one embodiment, video player 150 may be instantiated by a browser plug-in using a Flash file. Video player 150 may receive video streamed to a viewer over the Internet. In this way, the viewer may not need to store a video in its entirety before starting to play the video.

Video player 150 may also include various controls, for example, traditional video controls (e.g. play, pause, rewind and fast forward) as well as controls related to timed text. The controls may include buttons, dropdown menus, and other controls known in the art.

One of the controls may enable a user to play a timed text track in a selected language. If a video is presently playing, the control may enable a user to play a timed text track for the video being played in the selected language. When the language for the timed text track is selected, video player 150 may send a request to timed text server 160. The request may be, for example, an HTTP request with parameters. The parameters may include the presently playing video and the selected language. Viewer client 130 may send the HTTP request to timed text server 160.

In another embodiment, the request for a timed text track in a particular language may be generated automatically. In examples, one of viewer client 130, timed text server 160, or a video server 190 may automatically generate the request according to a default setting or user profile information. For instance, viewer server 190 may recognize a user with a Japanese language default setting and when a video has a timed text in a different source language such as English, then viewer client 130 (or video server 190) may automatically request a timed text track in the a different language such as Japanese. In one embodiment, video server 190 is on the same machine or machines as Tiered Text Server 160. In other embodiments, the two servers 190 and 160 are located separately.

As mentioned above, video player 150 may enable a user to merely select a target language to translate to. In another embodiment, video player 150 may enable a user to select a specific language from which to translate, as opposed to merely selecting the target language. In this case, video player 150 may append an argument at the end of the HTTP request indicating that a machine translation is requested. In an example, the HTTP request may include a parameter indicating a source language to translate from and a target language to translate to. The HTTP request may also include a special argument or parameter to notify timed text server 160 to translate the timed text. For example, the special argument may be "&translate" appended to the URL.

In an embodiment, video player 150 may also enable a user to select a specific timed text track from which to translate, as opposed to selecting a language from which to translate. There may be several tracks of the same language. Different tracks may have different content, as some may be transcribe the dialogue and others may offer commentary. Similarly, different tracks may differ in their reading level as varying reading levels may help teach people to read. Finally, different tracks may differ in their visual sophistication such as positioning and color. By enabling a user to select a specific source track, video player 150 provides the user with additional options in selecting a translation with different content, reading levels and visual sophistication.

When timed text server 160 receives the request for the timed text track, timed text server 160 may determine whether a timed text for the selected language is in timed text database 180. If the timed text exists in the selected language, there may be no need to execute a translation.

In an example, timed text server 160 may execute a database query, such as a SELECT statement on timed text database 180. Alternatively, there may be one or more intermediate servers between timed text server 160 and timed text database 180 and timed text server 160 may send a request (such as a web service request) to an intermediate server to determine the contents of timed text database 180. If timed text database 180 has the timed text for the playing video in the user's selected language, timed text server 160 sends the timed text to viewer client 130 to be displayed to the user by browser 102 or video player 150. In an example, timed text server 160 may send the entire timed text track to viewer client 130. Alternatively, timed text server 160 may stream the timed text to viewer client 130. Timed text server 160 may stream the timed text out of band of the video. Sending the timed text separately from the video allows for greater flexibility.

If timed text database 180 does not have a timed text for the video in the user's selected target, timed text database 180 may identify a timed text track to be to the target language. As mentioned above, some timed text corresponds to the dialogue of the video and other timed text provides commentary. Timed text database 180 may be configured to identify a timed text track that corresponds to the dialogue of the video, as opposed to commentary. As mentioned above, a request may also specifically identify a source timed text track.

Once the source timed text track is identified, timed text server 160 may send the source timed text track (or at least its text) to machine translator 110 along with parameters identifying the source language of the source timed text track and the target language of the requested translation. Machine translator 110 may use any type of automated translation algorithm to translate the timed text track. Example machine translation programs include a SYSTRAN program (available at http://www.systransoft.com/) and a PROMT program (available at http://www.online-translator.com/). Using the machine translation program, machine translator 110 translates the timed text track.

Upon completion of the translation, machine translator 110 may then send the translated timed text track back to timed text server 160. Then, timed text server 160 may send the translated timed text track onto viewer client 130 to display to the user. Machine generated translations may be less accurate than human-generated translations. For this reason, viewer client 130 may display a message to the user warning users of this potential inaccuracy.

By translating timed text in real time, as opposed to translating all the timed text in advance, embodiments of this invention can leverage advancements in improving machine translation algorithms. Further, with real-time translation, there is no need to store every possible translation for every timed text in advance.

In an embodiment, once a machine translation of a timed text track is generated, the translated timed text track may be stored for future use. In an embodiment, timed text server 160 may store the translated timed text track in timed text database 160. Timed text database 160 may store the machine translated timed text track with a flag to distinguish it from the potentially more reliable human translated tracks.

In another embodiment, the translated timed text track may be, for example, cached in a cache 164. Cache 164 is managed by a cache manager 162. In embodiments, cache 164 and cache manager 162 may be implemented on machine translator 110 or in video player 150. Implementing cache 164 on video player 150 obviates the need to re-fetch a timed text track that has already been translated and received. In an embodiment, cache manager 162 stores the translated timed text track for a period of time. After a period of time elapses, cache manager 162 may remove translated timed text track from cache 164. Other cache management algorithms may be used as would be known to those of skill in the art.

The cached translated timed text track may be a virtual timed text track that is presented to the user differently. While stored in cache 164, timed text server 160 may return the cached translation to the user when requested instead of requiring a new translation be generated. In this way, requests to machine translator 110 are reduced, conserving computing resources and improving load and latency. If cache manager 162 has removed the translated timed text track from cache 164, timed text server 160 may request another machine translation from machine translator 110. Algorithms for use in machine translation are continually improving. So, as old translations are updated in cache 162, the quality of the cached translations may improve.

In an embodiment, viewer client 130 may send a request to translate a timed text track to a servlet on a web server, and the servlet sends the request on to machine translator 110. This embodiment may be useful when a user is using viewer client 130 to upload or edit a timed text track. In this embodiment, an editor running on viewer client 130 may send a timed text file to the servlet. The servlet makes a request to machine translator 110, perhaps via a processing pipeline. Finally, the servlet returns the translated timed text track to viewer client 130.

In an embodiment, timed text tracks may be provide in-band with the video. This embodiment may be useful for certain types of clients, particularly mobile devices including smart-phones capable of playing video. In that embodiment, video player 150 may include a request for captions as part of the request it makes to the video server 190 for web video. Video server 190 may request an automatically translated timed text track from timed text server 160. Video server 190 may then combine the automatically translated timed text track with the web video stream. Video server 190 sends the video to video player 150 with the translated timed text already incorporated. Finally, video player 150 plays the video.

Machine translator 110, timed text server 160, viewer client 130, browser 102, and video player 150 can be implemented by software, firmware, hardware, or a combination thereof. Machine translator 110, timed text server 160 and viewer client 130 may be any computing device that supports network communication. Example computing or processing devices include, but are not limited to, a computer, workstation, distributed computing system, computer cluster, embedded system, stand-alone electronic device, networked device, mobile device, set-top box, television, or other type of processor or computer system.

Timed text server 160 may include a web server. A web server is a software component that responds to a hypertext transfer protocol (HTTP) request with an HTTP response. As illustrative examples, the web server may be, without limitation, Apache HTTP Server, Apache Tomcat, Microsoft® Internet Information Server, JBoss Application Server, WebLogic Application Server®, or Sun Java™ System Web Server. The web server may serve content such as hypertext markup language (HTML), extendable markup language (XML), documents, videos, images, multimedia features, MACROMEDIA Flash programs, or any combination thereof. These examples are strictly illustrative and do not limit the present invention.

Method

Figure 2:
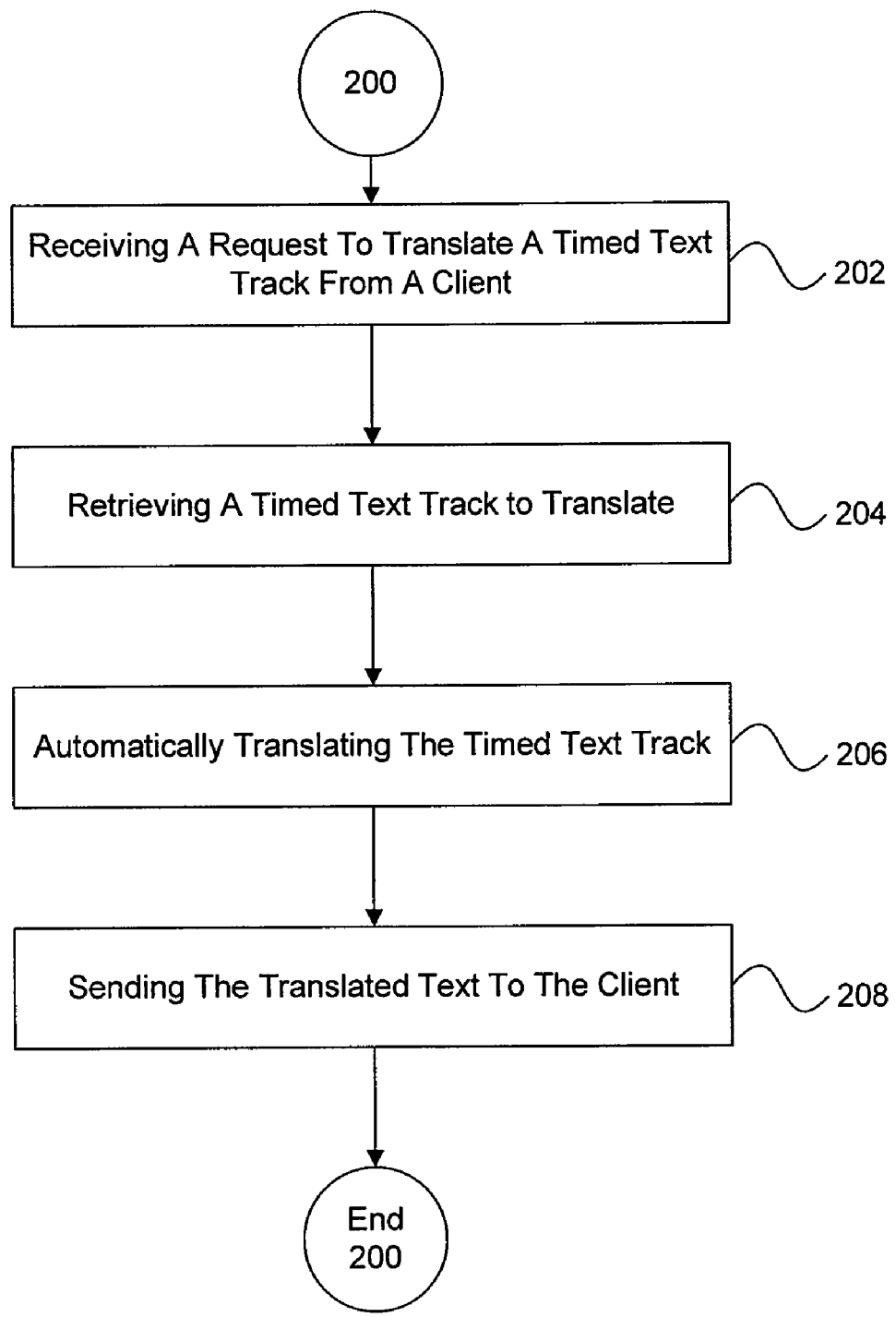
FIG. 2 is a flowchart illustrating a method for translating timed text for web video according to an embodiment of the present invention.

FIG. 2 is a flowchart illustrating a method 200 for translating timed text for web video according to an embodiment of the present invention.

Method 200 begins by receiving a request to translate a timed text track for a web video from a client at step 202. As mentioned above, the request includes a target language to translate to. The request may also include the source language or a specific source timed text track to translate from.

At step 204, a timed text track for the web video is retrieving from a timed text database. Each timed text track in the timed text database specifies text to display at particular times in a video. As mentioned above, the timed text track may be retrieved based on different criteria according to the content of the request received in step 202. For example, if the request only specify the target language, a timed text track may be retrieved that corresponds to dialogue (as opposed to commentary). If the request specifies both the target language and a source language, a timed text track may be retrieved that both corresponds to dialogue and is in the specified source language. Finally, if the request specifically identifies a particular timed text track from which to translate, that timed text track may be received.

At step 206, text from the timed text track retrieved in step 204 is automatically translated into a target language. As mentioned above, the text may be translated using any automated machine translation algorithm. As mentioned above, example machine translation programs include a SYSTRAN program and a PROMT program.

At step 208, the translated text is sent to the client to display with the web video. In this way, the captions are automatically translated to the viewer's language.

Example User Interface

FIGS. 3-10 illustrate screenshots of an example user interface which may be used by the system in FIG. 1. In examples, the screenshots in FIGS. 3-10 may be generated by video player 150 in FIG. 1.

Figure 3:
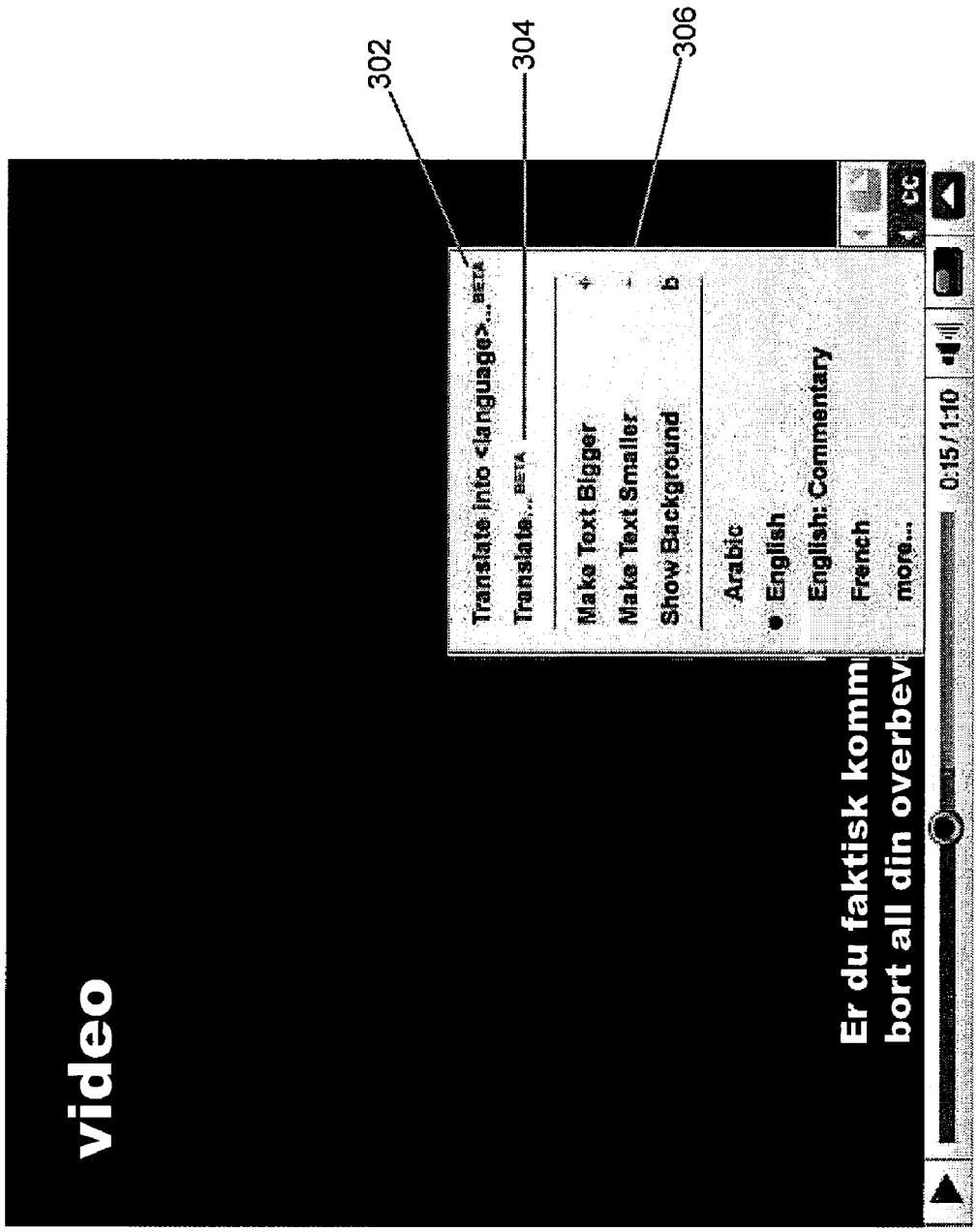
FIGS. 3-10 illustrate screenshots of an example user interface which may be used by the system in FIG. 1.

FIG. 3 illustrates a screenshot 300. Screenshot 300 includes a menu 306, such as a pop-up menu, including a menu option 302. Menu option 302 provides a user an option to translate a timed text into a default language. The default language may be set, for example, in a user profile. Menu option 302 may also appear in the user's native language.

Figure 4:
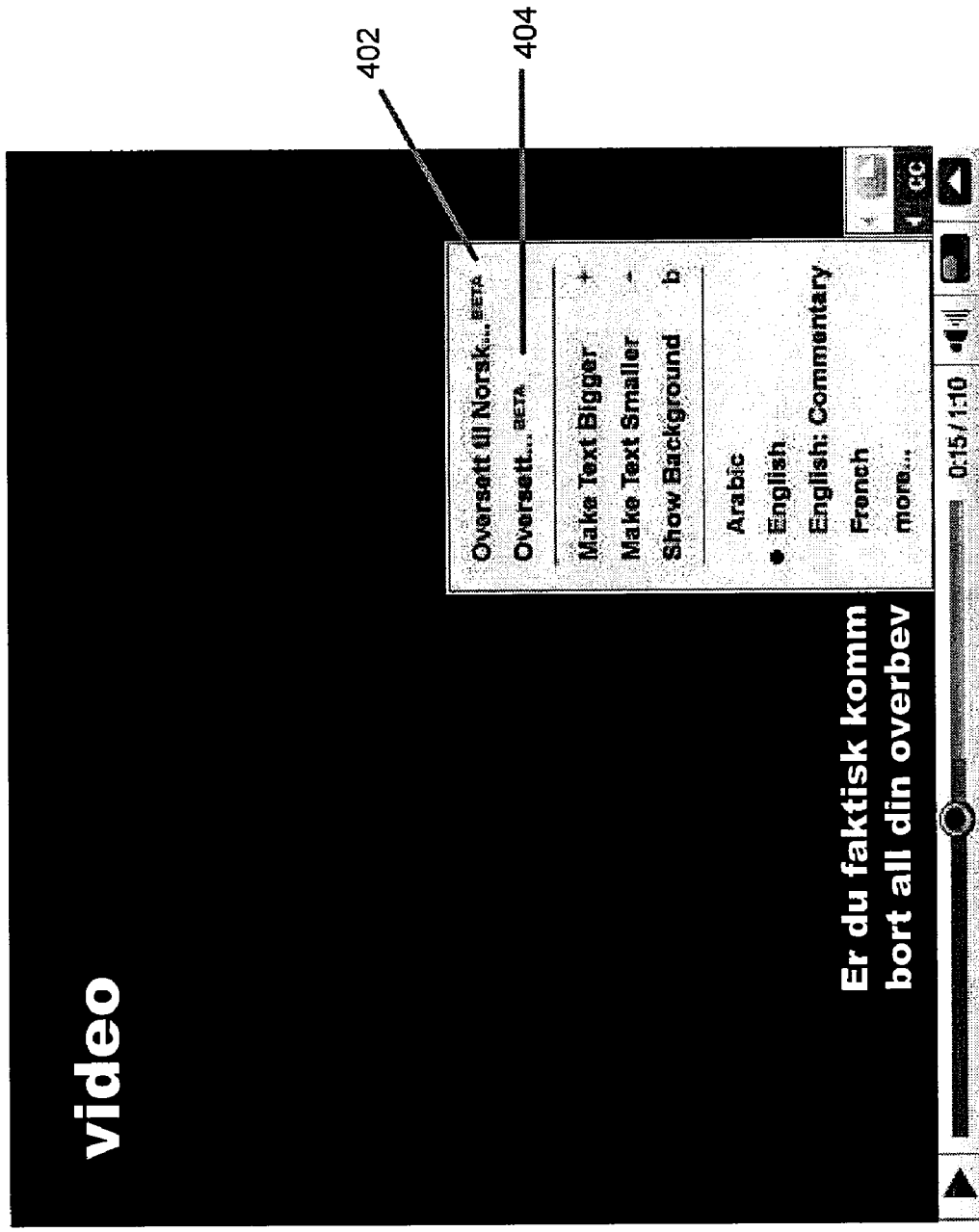
Figure 5:
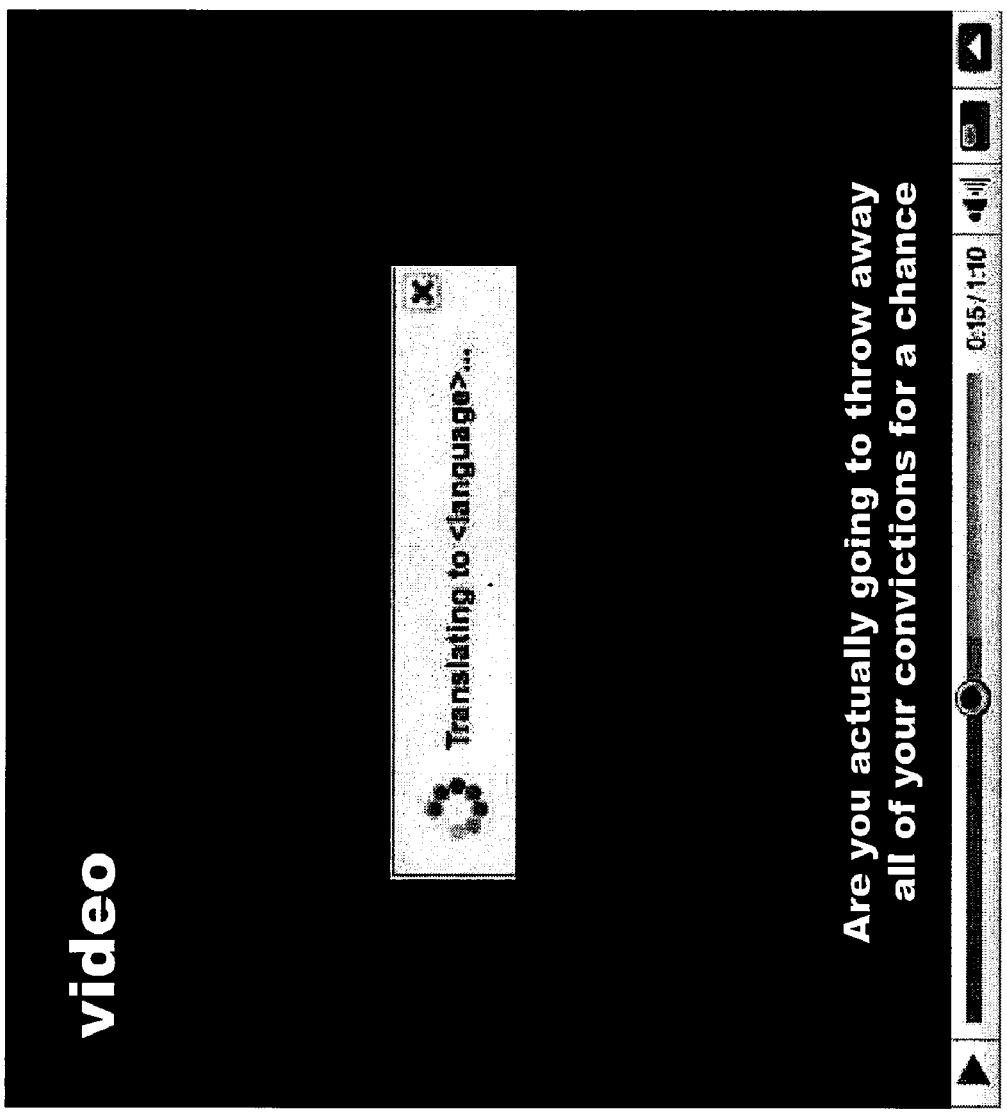
Figure 6:
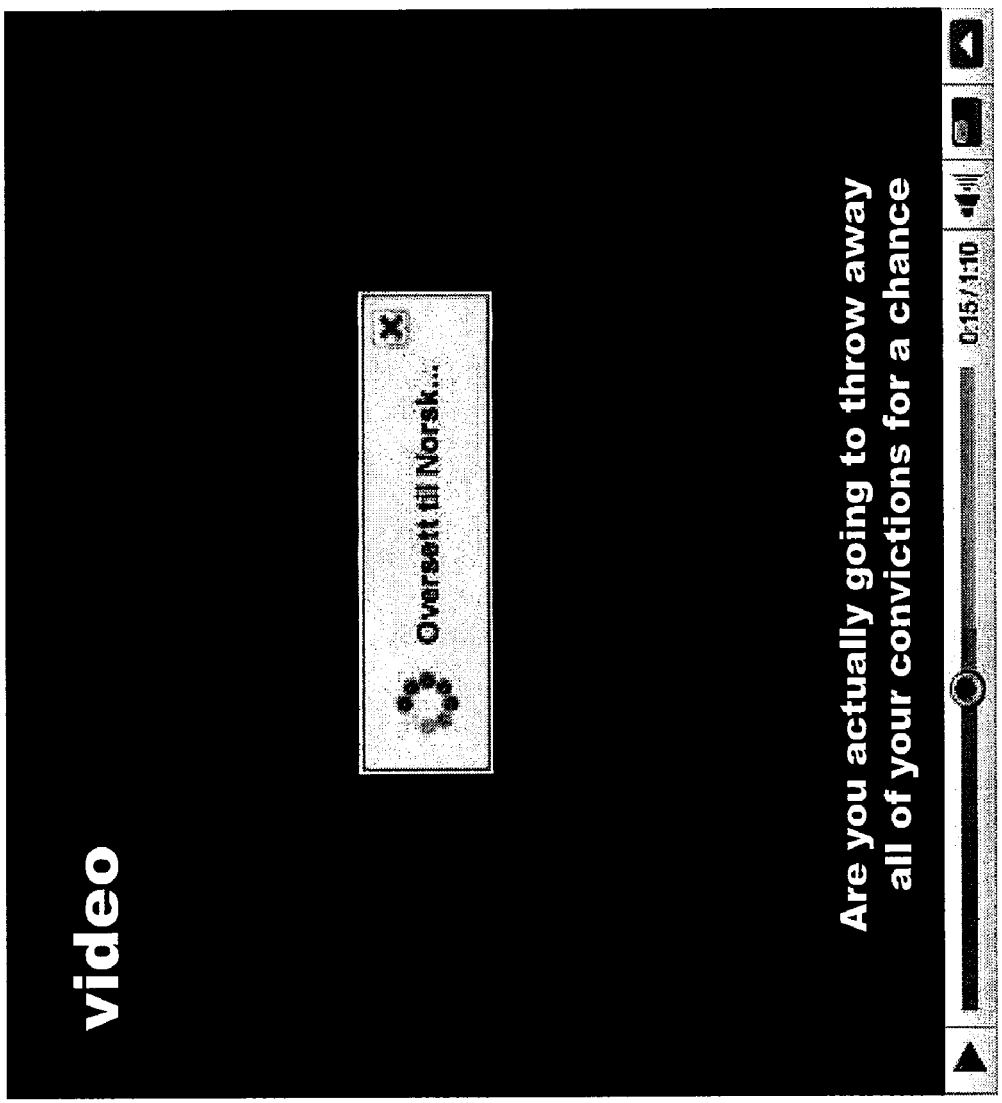

An example menu option in the user's native language is illustrated in FIG. 4 in screenshot 400. Screenshot 400 shows a menu option 402 that provides the user an option to translate into Norsk. Further, menu option 402 is in the Norwegian language, Norsk. When user selects menu option 302 or menu option 402, video player 150 may display a screenshot such as screenshot 500 in FIG. 5 or screenshot 600 in FIG. 6. Screenshots 500 and 600 tell the user that the translation is in progress. In an example, the video may pause while the translation is in progress and screenshots 500 and 600 are being displayed.

Referring back to FIG. 3, screenshot 300 offers another menu option 304. When a user selects menu option 304, the user may select a source language to translate from and a target language to translate to. Menu option 304 should also appear in the user's native language. For example menu option 404 in FIG. 4 appears in a user's native language, Norsk.

Figure 7:
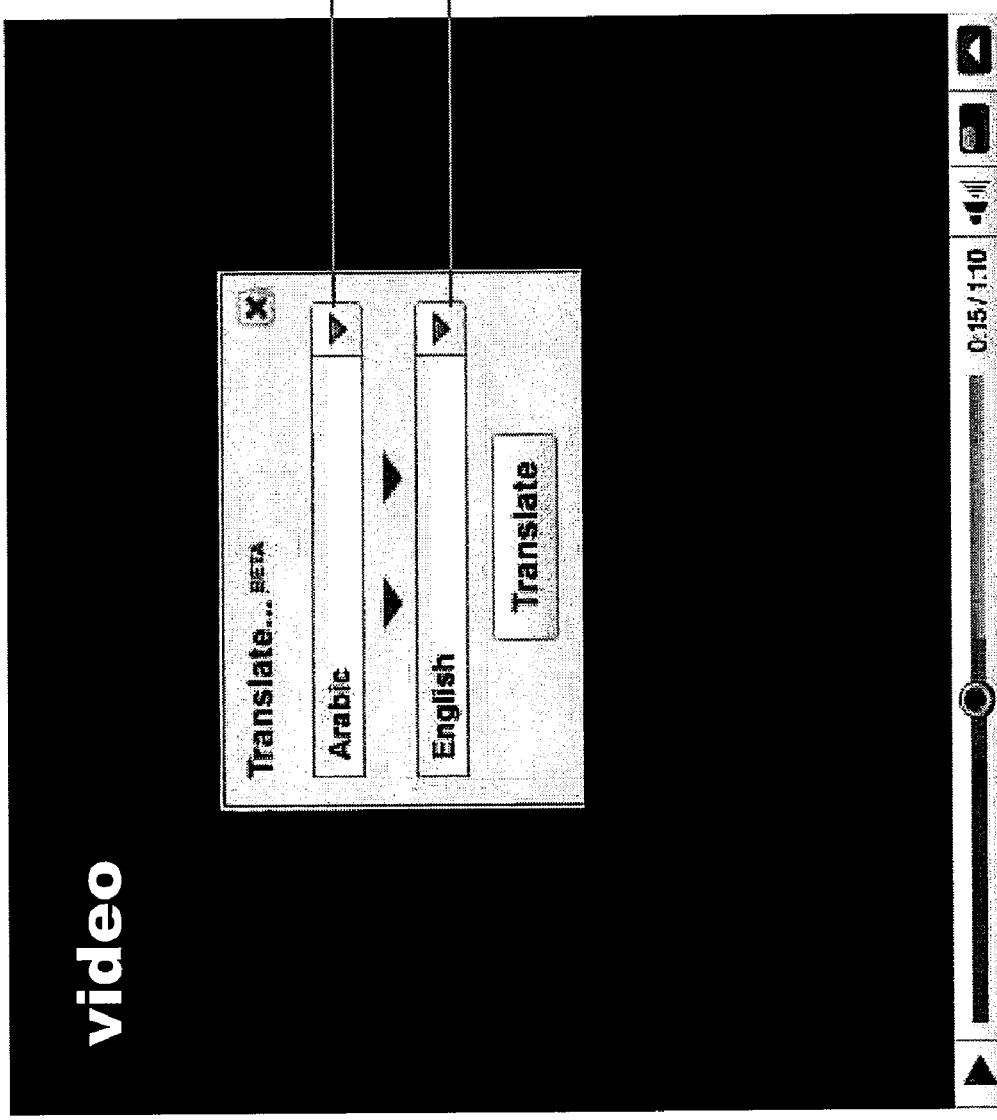
Figure 8:
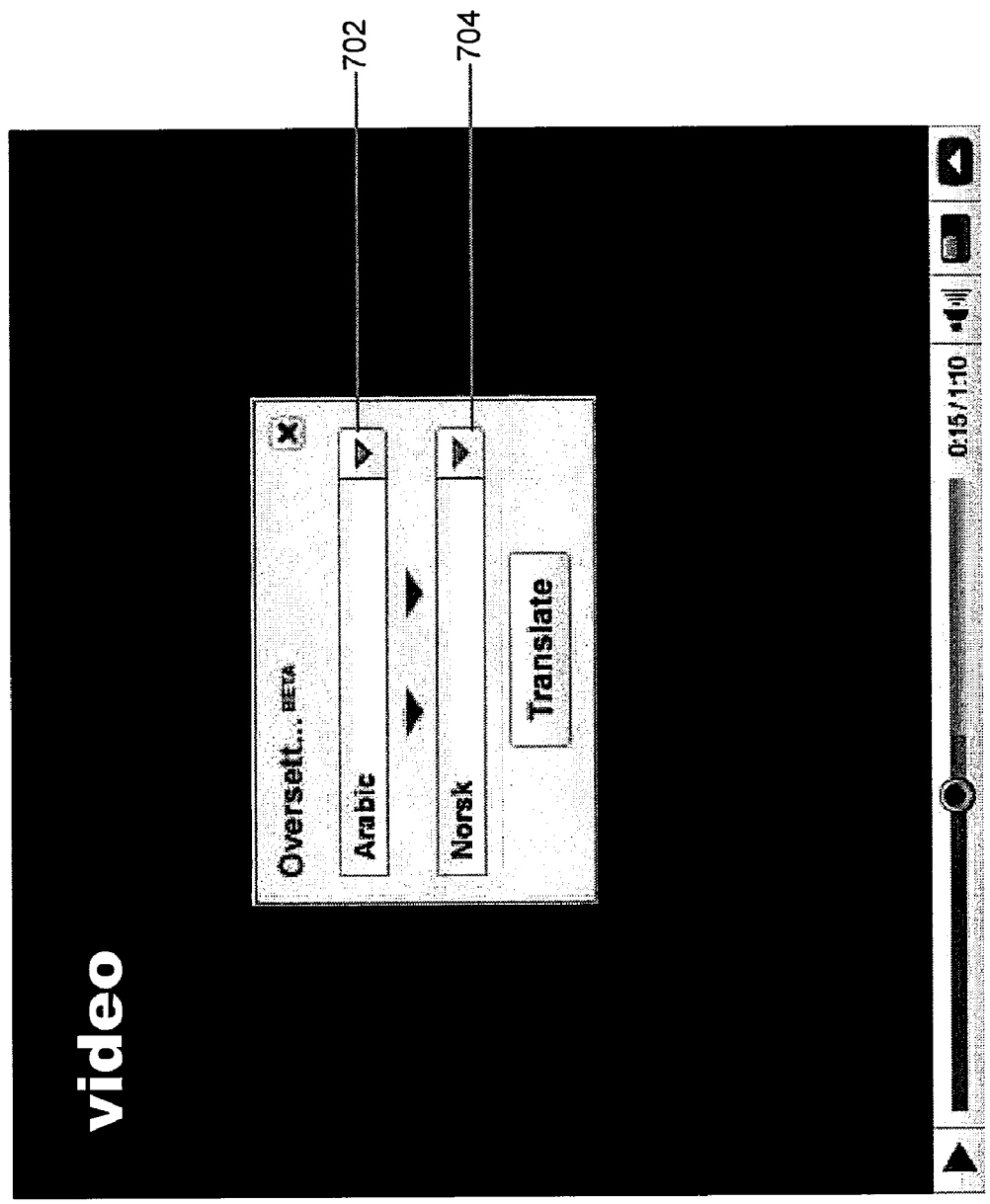
Figure 9:
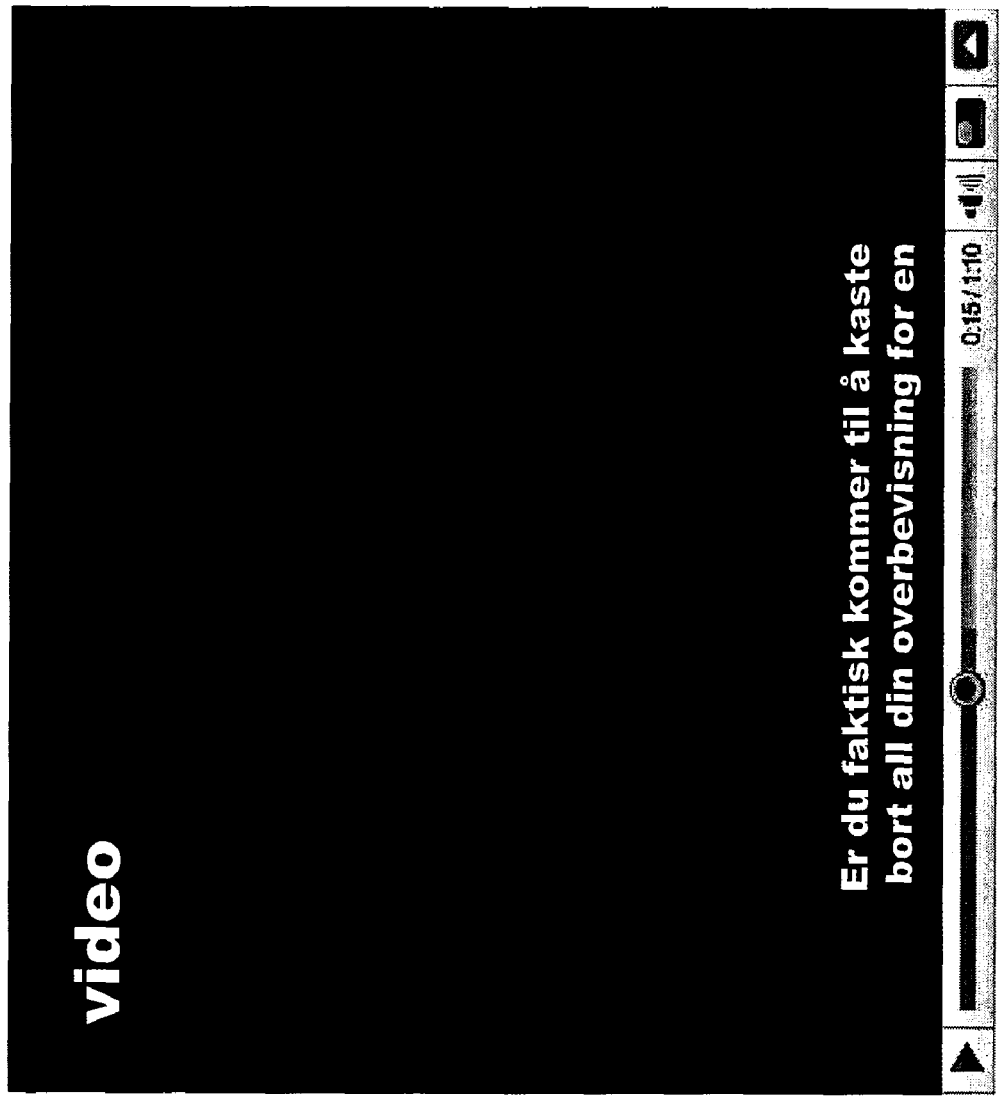
Figure 10:
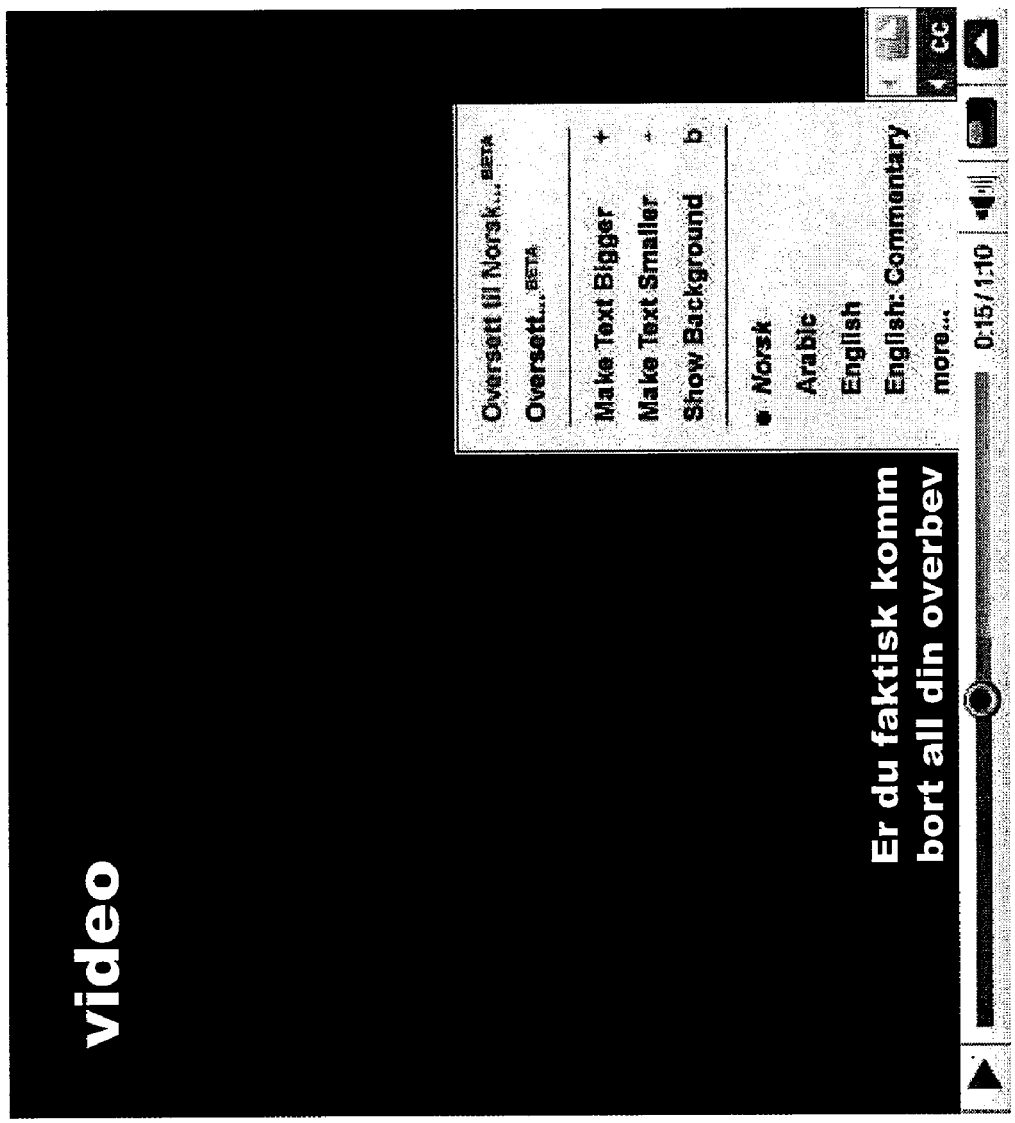

Upon selecting menu option 304 or 404, a screenshot 700 in FIG. 7 or a screenshot 800 in FIG. 8 may appear. Screenshots 700 and 800 enable a user to configure a request for translation in response to menu option 304 or 404. In an example, the video may be pause while the user is entering information on screenshots 700 and 800. Screenshots 700 and 800 each include a pop up window. The pop up windows contain a top drop down menu 702 and a bottom drop down menu 704. Top drop down menu 702 provides a list of tracks or a list of languages that can be used to translate from. Bottom drop down menu 704 provides a list of languages that the timed text can be used to translated to.

After the user has requested the translation and the translation has been returned to the client, the client continues playing the video with the translated timed text. This is roughly illustrated in screenshot 900 in FIG. 9. Also if the user opens the menu options, the menu options are illustrated in screenshot 1000 in FIG. 10.

Conclusion

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for providing an interface to translate automatically timed text for web video, comprising:
    (a) playing the web video with timed text in a language of audio for the web video;
    (b) while the web video is being played in (a), presenting a first user interface control, the first user interface control including first option to translate from the language of the audio for the web video to a default language and a second option to present a second user interface control;
    when the user selects the second option:
        (c) presenting the second user interface control, the second user interface control enabling input of a target language;
        (d) receiving a user's selection of the target language in the second user interface control presented in (c);
        (e) sending a request for a translation, the request including a target translation language, wherein the target translation language is the default language when the user selects the first option, and wherein the target translation language is the target language selected in (c) when the user selects the second option;
        (f) in response to the request, receiving a timed text track including text automatically translated to the target language; and
        (g) displaying at least a portion of the timed text track synchronized with the web video according to timing data in the timed text track.

2. The method of claim 1, wherein the first user interface control is a first menu and the second user interface control is a second menu.

3. The method of claim 2, further comprising:
    (h) determining which language is stored as the default language in the user profile, and wherein the presenting (b) comprises presenting the first menu such that the first and second options are listed in the determined language.

4. The method of claim 3, wherein the default language is the user's native language as set in profile information for the user.

5. The method of claim 2, wherein the presenting (c) comprises presenting the second menu to input a source language, wherein the receiving (d) comprises the receiving a user's selection of the source language, and wherein the request sent in (e) specifies the selected source language as a language to translate from.

6. The method of claim 2, wherein the timed text track is translated using a machine translation algorithm to translate text from the timed text track into the target language.

7. A system for providing an interface to translate automatically timed text for web video, comprising:
    a computing device;
    a web browser implemented on the computing device;
    a video player downloaded from a web server to the computing device and run within the web browser that:
        (a) plays the web video with timed text in a language of audio for the web video;
        (b) while the web video is being played in (a), presents, in a single view, a first user interface control, the first user interface control including an first option to translate from the language of the audio for the web video to a default language and a second option to present a second user interface control;
        when the user selects the second option:
            (c) presents the second user interface control, the second user interface control enabling input of a target language;
            (d) receives a user's selection of the target language in the second user interface control presented in (c);
            (e) sends a request for a translation, the request including a target translation language, wherein the target translation language is the default language when the user selects the first option, and wherein the target translation language is the target language selected in (c) when the user selects the second option;
            (f) in response to the request, receives a timed text track including text automatically translated to the target language; and
            (g) displays at least a portion of the timed text track synchronized with the web video according to timing data in the timed text track.

8. The system of claim 7, wherein the first user interface control is a first menu and the second user interface control is a second menu.

9. The system of claim 8, wherein the video player determines which language is stored as the default language in the user profile and presents the first menu such that the first and second options are listed in the determined language.

10. The system of claim 8, wherein the default language is the user's native language as set in profile information for the user.

11. The system of claim 8, wherein the second menu enables input of a source language, wherein the user's selection includes the source language, and wherein the request specifies the selected source language as a language to translate from.

12. The system of claim 8, wherein the timed text track is translated using a machine translation algorithm to translate text from the timed text track into the target language.

* * * * *